Jan. 15, 1935.   E. T. CROASDALE ET AL   1,987,605
AUTO TOP MATERIAL AND THE LIKE
Filed Jan. 29, 1932
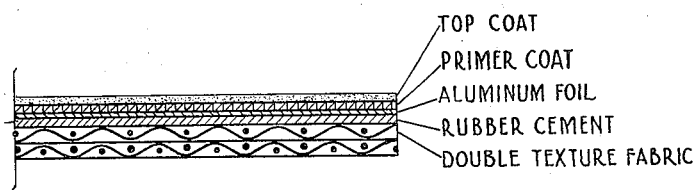
INVENTOR.
Evan T. Croasdale
BY Russell Morgan
ATTORNEY.

Patented Jan. 15, 1935

1,987,605

UNITED STATES PATENT OFFICE 1,987,605

AUTO TOP MATERIAL AND THE LIKE

Evan T. Croasdale, Bridgeport, and Russell Morgan, Fairfield, Conn., assignors to E. I. du Pont de Nemours & Company, Wilmington, Del., a corporation of Delaware Application January 29, 1932, Serial No. 589,558

12 Claims. (Cl. 154—50)

This invention relates to auto top material, and the like, and the method of finishing same, and more particularly, relates to rubber coated auto top material containing an intermediate film of metal foil.

The commonly used auto top today comprises a fibrous base sheet, generally a single or multiple layer fabric sheet coated with rubber, resin compositions, or the like, over which is applied a coating of paint, varnish, or lacquer. This top material is usually applied to the car after the lacquer, or other finishing compositions, on the body of the car is applied. Due to the flexible nature of the top material it has not been practical to apply the lacquer used in finishing the body of the car to the top material as it chips or flakes off. The application of colored varnish type coating materials to the top material has not been found practical either. The use of wooden or metal tops for cars, which would give suitable surfaces for lacquers, is objectionable because of the resonant characteristics of such auto tops which cause amplification of the motor vibrations.

An object of the present invention is to provide an auto top material which can be satisfactorily finished at the same time as the body of the car with the same type of finish as used on the body. A further object is to provide auto top material which can be satisfactorily finished with the commonly employed lacquers, paints, or varnishes. A further object of the invention is to provide an economical method of finishing auto top material so that it will have the above properties. Other objects of the invention will be apparent from the description given hereinafter.

The above objects are accomplished according to the present invention by employing a layer of metal foil intermediate a non-resonant fibrous base auto top material and a top surface film of a coating composition.

The following examples are given to illustrate specific embodiments of the invention:—

Example 1.—Auto top material comprising a rubber sheet calendered on a double texture fabric consisting of sheeting impregnated with rubber cement and combined to drill which has been base coated with rubber cement, is coated with a polyhydric alcohol-polybasic acid resin adhesive of the following composition:—

|  | Per cent |
|---|---|
| *Modified polyhydric alcohol-polybasic acid resin | 22.50 |
| Xylol | 11.25 |
| Butyl acetate | 21.25 |
| Ethyl alcohol | 22.50 |
| Shellac | 22.50 |
|  | 100.00 |

*The resin consisted of:—

|  | Per cent |
|---|---|
| Glycerin | 22.73 |
| Phthalic anhydride | 46.31 |
| China-wood oil acid | 30.96 |

A sheet of aluminum foil 0.004 thick is also coated with this same adhesive resin and after solvent has been removed from the adhesive coatings, the aluminum is superimposed upon the adhesive coated top material and bonded thereto by passing between steel rollers at a temperature in excess of 250° F., but not sufficiently high to damage the rubber sheet. A resin temperature of 275–300° F. coincident with pressure exerted by polished steel rolls is necessary to assure perfect bonding by the adhesive.

Aluminum foil to be satisfactory for this purpose must be thoroughly cleaned by well known methods to remove lubricants used in the manufacture of the foil.

After combining the foil to the top material as indicated above, the product is embossed in the usual manner. The material is then placed on the car and finished with the same primer and top coats that are applied to the rest of the car.

Applicants make no claim to be the inventors of the particular adhesive composition disclosed in Example 1.

Example 2.—Auto top material was prepared exactly in accordance with Example 1, except that the adhesive used was a 50% solution of asphalt in commercial xylol, the asphalt having a melting point between 180–220° F.

The top material may be finished with a top coat of varnish, either pigmented or non-pigmented, paint, or various types of cellulose derivative lacquers, with or without primers. The finishing composition can be applied to the top material either before or after the top material is disposed on the auto. Also embossing is optional, depending upon whether a smooth surface or a grained or embossed surface is desired.

Instead of rubber coated sheeting or drill, any other fabric suitable for auto top material may be employed and may be coated or impregnated with rubber latex, pyroxylin, natural or synthetic resins, such as the polyhydric alcohol-polybasic acid resins, or phenol formaldehyde type resins, oil or asphalt compositions, as is well understood by those familiar with the manufacture of auto top material. Moreover, a non-resonant fibrous base or board could be used, for instance, insulating boards made of wood pulp, sugar cane, corn stalks, and the like, which, if desired, may be impregnated with compositions functioning as a binding agent for the fibers of the base to give increased strength. Among the suitable compositions for this purpose may be mentioned rubber latex, pyroxylin, natural or synthetic resins, asphalt, glue and similar compositions.

The cement employed for bonding the aluminum foil and the top material should preferably be a thermoplastic one, due to the fact that the aluminum foil greatly retards the evaporation of solvent from the adhesives and, consequently, those adhesives which depend upon their set through evaporation of solvent are not as suitable as thermoplastic adhesives which set on the application of heat and pressure. However, a wide variety of adhesives may be employed, such as asphalt resins, glue, and the like.

The composition of suitable thermoplastic adhesives has been given in the above specific examples, but both the ingredients and proportions may be varied widely without departing from the spirit of this invention.

In place of aluminum foil, other metal foil may be used, such as copper, brass, and soft iron foil, but aluminum foil has been found most satisfactory. The thickness of the metal foil may be varied widely, although the use of an unnecessarily thick foil is obviously uneconomical. A thickness of 0.0005 to 0.01 of an inch is preferred, although foil whose thickness is outside of this range may be used.

In the preferred form of the invention, the top material after application of the metal, is disposed on the auto and is finished by applying the same primer and finishing lacquer being used on the body of the auto at the same time the body of the auto is being finished. This is advantageous in lending itself to economical finishing of the auto and has the added advantage that the finish on the top of the auto and on the body will match perfectly. Extensive tests have shown that the application of typical automobile primer coats and finishing pyroxylin lacquers to the top material prepared in accordance with this invention will not chip or flake and compare favorably in durability with the specially finished auto tops now in use.

A typical primer particularly suitable for coating the aluminum foil surface is as follows:

| | Per cent |
|---|---|
| Pigment | 35 |
| Mineral spirits | 23 |
| Japan drier | 7 |
| *Varnish | 35 |

* The varnish consisted of rosin, China-wood oil, and linseed oil, in naphtha plus a small amount of drier. The above is an oil type primer.

A typical oil type primer particularly suitable for coating copper foil is as follows:

| | Per cent |
|---|---|
| Pigment | 21.0 |
| Mineral spirits | 19.5 |
| China-wood oil | 6.5 |
| Linseed oil | 10.0 |
| Naphtha | 42.0 |
| Drier | 1.0 |

The above primer compositions merely illustrate particularly suitable primers, but any of the commonly used primers, either of the oil type or the cellulose ester type, may be employed. The cellulose ester type primers are very suitable when copper foil is used.

Where the top surface is embossed, the application of a surfacer over the primer coat before application of the top coat is hardly warranted, but if a smooth finished material is desired, any of the well known surfacers may be applied over the primer. In the finishing of the top material, the same number of coats of primer and lacquer may be applied as applied to the body of the car, i. e., usually one or two coats of the primer and two to eight or so coats of the lacquer.

It will be understood that auto top material according to this invention is not limited to material finished with both primer coats and finishing lacquers, or with any particular type of lacquer or coating composition. The common lacquers for auto bodies generally comprise low viscosity cellulose nitrate, plasticizers, resins and/or gums, solvents, diluents, and pigments. Such lacquers may be applied over the usual primer coats without danger of the film thus built up chipping or flaking off from the metal foil surface. Also varnishes, pigmented or not, paints, cellulose ester and cellulose ether lacquers, and the like, may be applied to the foil with satisfactory results. The auto top material of this invention is thoroughly waterproof and is semi-rigid, or, if a fiber board base is used, substantially rigid.

When finished with the same primer and lacquer as used on the body of the auto, the finish of the car will be uniform and will remain uniform, as the finish on the top material will not be affected by sun, rain, et cetera, at any substantially different rate than the finish on the body of the auto. The top coat may be applied in any known manner in one or several applications.

While this invention has been described with particular reference to auto top material, it will be understood that the material is likewise adapted to cover boat decks, porch coverings, carriage tops, and the like.

As many apparently widely different embodiments of this invention may be made without departing from the spirit and scope thereof, it is to be understood that the invention is not limited to the specific embodiments thereof except as defined in the appended claims.

We claim:

1. As an article of manufacture, auto top material comprising a rubber coated fabric base, an intermediate film of foil of a metal from the group consisting of aluminum, copper, brass, and iron, and a surface film of a coating material from the group consisting of paints, varnishes, and lacquers.

2. As an article of manufacture, auto top material comprising a rubber coated fabric base, an intermediate film of foil of a metal from the group consisting of aluminum, copper, brass, and iron, and a pigmented cellulose nitrate lacquer surface film.

3. As an article of manufacture, auto top material comprising a rubber coated fabric base, an intermediate film of aluminum foil, and a surface film of a coating material from the group consisting of varnishes, lacquers and paints.

4. As an article of manufacture, auto top material comprising a rubber coated fabric base, an intermediate film of aluminum foil, and a pigmented cellulose derivative lacquer surface film.

5. As an article of manufacture, auto top material comprising a rubber coated fabric base, an intermediate film of aluminum foil, and a pigmented cellulose nitrate lacquer surface film.

6. As an article of manufacture, auto top material comprising a rubber coated fabric base, a film of thermoplastic adhesive superposed thereon, a film of aluminum foil superposed on said adhesive film, and a pigmented cellulose nitrate lacquer surface film.

7. As an article of manufacture, auto top material comprising a rubber coated fabric base, an intermediate film of aluminum foil of 0.0005-0.01 of an inch thickness, and a pigmented cellulose nitrate lacquer surface film.

8. Auto top material comprising a rubber coated fabric base, a film of thermoplastic cement superposed thereon, a film of foil of a metal from the group consisting of aluminum, copper, brass, and iron superposed on said adhesive film, and a surface film of a coating material from the group consisting of paints, varnishes, and lacquers.

9. Auto top material comprising a rubber coated fabric base, a film of thermoplastic polyhydric alcohol-polybasic acid synthetic resin cement superposed thereon, a film of foil of a metal from the group consisting of aluminum, copper, brass, and iron superposed on said adhesive film, and a surface film of a coating material from the group consisting of paints, varnishes, and lacquers.

10. Auto top material comprising a rubber coated fabric base, a film of thermoplastic cement superposed thereon, a film of foil of a metal from the group consisting of aluminum, copper, brass, and iron superposed on said adhesive film, and a pigmented cellulose nitrate lacquer surface film.

11. Auto top material comprising a rubber coated fabric base, a film of thermoplastic polyhydric alcohol-polybasic acid synthetic resin cement superposed thereon, a film of aluminum foil superposed on said adhesive film, and a pigmented cellulose nitrate lacquer surface film.

12. Auto top material comprising a rubber coated double texture fabric base, a film of thermoplastic adhesive superposed thereon, a film of aluminum foil of 0.0005-0.01 of an inch thickness superposed on said adhesive film, and a pigmented cellulose nitrate lacquer surface film.

EVAN T. CROASDALE.
RUSSELL MORGAN.